Nov. 16, 1954　　　　B. TAMBURINI　　　　2,694,744
PROCESS FOR MAKING SEPARATORS FOR ELECTRIC STORAGE
BATTERIES AND PRODUCT OBTAINED THEREBY
Filed June 11, 1951

INVENTOR.
Bruno Tamburini
BY
Attorneys.

United States Patent Office 2,694,744
Patented Nov. 16, 1954

2,694,744

PROCESS FOR MAKING SEPARATORS FOR ELECTRIC STORAGE BATTERIES AND PRODUCT OBTAINED THEREBY

Bruno Tamburini, Milan, Italy, assignor to "Flexa" Industria Materie Plastiche S. p. A., Milan, Italy Application June 11, 1951, Serial No. 231,045

Claims priority, application Italy June 13, 1950

2 Claims. (Cl. 136—146)

It is known that in storage batteries, in order to avoid contact between any two plates of different polarity and in order to allow for electrolytic diffusion at the same time, spacing members are used which are commonly called separators or diaphragms.

In order to meet the requirements mentioned, said separators in turn have to possess various technical characteristics, of which we mention the principal ones:

1. Sufficient mechanical strength (resistance to compressive stress, bending stress and tensile stress).
2. Good dimensional stability, even after immersion into the electrolyte.
3. High permeability capacity.
4. Resistance to the attack of acid or alkaline liquids used as electrolytes in electric storage batteries.

It is also known that two systems of construction for separators of storage batteries are employed in the practice.

(a) One system utilizes between the plates of opposed polarity, a thin porous web or diaphragm of wood connected to a perforated spacer of various materials (ebonite, polyvinyl chloride, polyethylene, polystyrene, etc.), more or less corrugated or ribbed.

(b) The other system utilizes only one single element conveniently shaped and possessing a microporous structure, thus combining the two requirements of a porous web and of a separator.

Said separators are generally obtained by moulding or by extrusion of ebonite, of polyvinyl or polystyrene resins, etc. rendered microporous with known procedures based upon the liberation of appropriated previously included substances, by gasification and by chemical or biochemical extraction.

The separators of the (b) type obtained by the procedures mentioned and known so far in this field, offer all more or less such disadvantages as:

Fragility
Poor porosity
High cost
Easy clogging of the micropores
Poor resistance to heat
Limited life
Great resistance to the passage of electric current.

According to the present invention, a material is provided, from which plates may be formed which are useful both as diaphragms as wall as spacers and, therefore, utilizable as the (b) type mentioned hereinbefore, but made with a process offering much greater advantages, since the separators obtained with the present process offer, together with low cost and easy industrial production, also: good mechanical strength; constant permeability to liquids and to the passage of ions; very high heat resistance; and practically unlimited duration of employment.

Referring to the drawings.

Figure 1:
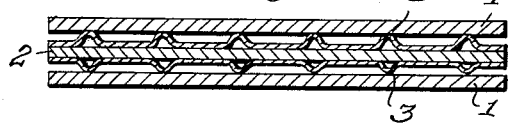
Fig. 1 is a transverse section of a storage battery plate assembly.
Figure 2:
Fig. 2 is a transverse section of the separator shown in Fig. 1 and on the line 2—2 of Fig. 3.
Figure 3:
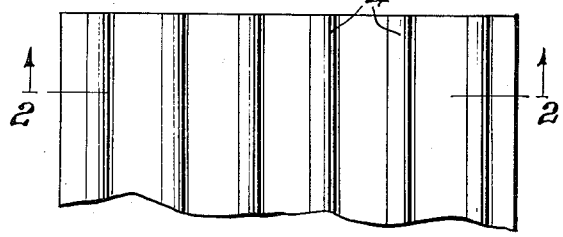
Fig. 3 is a fragmentary elevation of Fig. 2.
Figure 4:
Fig. 4 is a transverse section of a modified form of separator on the line 4—4 of Fig. 5.
Figure 5:
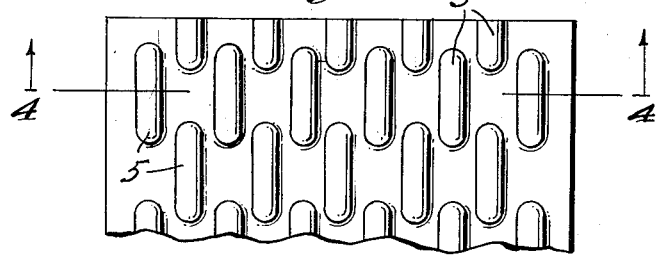
Fig. 5 is a fragmentary elevation of the separator shown in Fig. 4.
Figure 6:
Fig. 6 is a transverse section of another modified form of the separator on the line 6—6 of Fig. 7.
Figure 7:
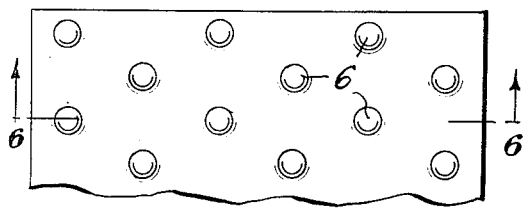
Fig. 7 is a fragmentary elevation of Fig. 6.

The positive plates 1 are held in space relationship with the negative plate 2 by the separators 3. In the form shown in Figs. 1, 2, and 3, the plate is provided with ribs 4 running lengthwise of the plate. In the form shown in Figs. 4 and 5, the ribs are in staggered relationship. In the form shown in Figs. 6 and 7, instead of ribs the separator is provided with staggered projections.

The principal characteristic feature of the separators according to the present invention is that they are constituted by a support of fibrous material conveniently impregnated with synthetic resins containing absorbent substances. The support may be constituted of card fleece or of a fabric, either obtained from fibres resistant to the acid or alkaline solutions employed in electric storage batteries, for instance fibres obtained from glass, asbestos, polyamide resins, polyvinyl resins, resins of vinylidene chloride, methyl polyvinyl resins, polyacrylnitrile resins, polyethylene resins, etc.

The resins with which the fibrous support is impregnated, may be thermoplastic or thermosetting; they must however be resistant to the attack of the electrolytes employed in storage batteries at the operating temperatures therein.

The substances incorporated in the resins used for impregnating the support, have a high absorbent power for liquids; therefore, they enable the resins to remain more or less permeable to the electrolytes according to the quality and quantity of said substances incorporated with said resins.

Said absorbent substances are of inorganic nature, practically inert to the chemical action of the electrolytes contained in the electric storage batteries (solution of $H_2SO_4$ up to 35° Bé. or solutions of KOH or NaOH up to 20%), remaining perfectly incorporated with the resinous mass fixed to the fibrous support.

Said substances are used in the form of very fine powder, passing through a sieve of 900 meshes per sq. cm. and preferably finer. They may be for instance silica gel, bentonite and the like, with possible addition of non absorbent filling materials.

The assembly formed by the fibrous support and by the resin with which the absorbent substances have been incorporated has the particular characteristic of being mouldable under pressure in cold condition or in hot condition, in such a manner as to allow for providing the convenient ribs, corrugations or projections as necessary for assigning the diaphragm also the function of a spacer-separator.

*Examples*

1. Glass wool composed of most fine fibres is reduced by carding into a multiple web having a thickness of 0.5 mm. and a specific weight of 110 grams per square meter. A 50% alcoholic solution of phenol-formaldehyde resol is then prepared; separately, 500 grams of white bentonite of Ponza in the form of fine powder is passed through a sieve of 12,000 meshes per sq. cm. and is swollen with 500 grams of water, and the paste obtained is allowed to stand for about 10 hours.

100 grams of the above alcoholic solution of resol are then added to the paste in a conventional rotary agitator. The mixture obtained is then spread equally on both faces of 5 square meters of the above web, using a conventional spreading machine.

The sheet thus obtained is dried during 5 hours at a temperature of 50° C. and is successively cut into pieces of suitable form and dimensions and pressed into corrugated thin plates in suitable molds with a pressure of 50 grams per square cm. at a temperature of 180° C. for 2 minutes. Separators having the aforementioned qualities are thus obtained.

2. A mixture is prepared consisting of equal parts of a stabilized emulsion of polyvinyl chloride at 50% (known in the trade as Geon Latex) and a paste made of 80 parts by weight of bentonite, 20 parts by weight of kaolin and 100 parts by weight of water, said bentonite and kaolin being in the form of a powder passed through a sieve of 15,000 meshes per sq. cm.

The aforesaid mixture is evenly spread on both faces of a fabric made of polyvinyl chloride (known in the trade as Rhovil) having a specific weight of 200 grams per square meter, in the proportion of 400 grams of said mixture per square meter of fabric.

The fabric thus treated is left to dry at ambient temperature and is then molded into suitable pieces at a temperature of 120° C., separators having the above qualities being thus obtained.

Having now particularly described and ascertained the nature of my said invention and in what manner the same is to be performed, I declare that what I claim is:

1. The method of preparing an ion permeable separator for electric storage batteries which comprises providing a water paste of a finely divided colloidal substance selected from the group consisting of bentonite and silica gel which has been swollen in water to produce a gelatinous paste, mixing the paste with a plastic binder, applying such mixture on a carrier of fibrous inert material to completely impregnate the same, drying the resultant product, the colloidal substance in the further swollen and gelatinous condition thereof produced by the electrolyte in the battery providing the separator with the property of ion permeability.

2. A separator for electric storage batteries in the form of a compact, resistant, elastic body and formed from a water paste of very fine grains of a colloidal substance selected from the group consisting of bentonite and silica gel mixed with a plastic binder, the mixture completely surrounding and filling a support of fibrous inert material, the separator when soaked by the electrolyte being characterized by the property of ion-permeability.

References Cited in the file of this patent

UNITED STATES PATENTS

| Number | Name | Date |
|---|---|---|
| 1,206,983 | Bliss | Dec. 5, 1916 |
| 1,500,220 | Benner | July 8, 1924 |
| 1,577,450 | Crowell | Mar. 23, 1926 |
| 1,744,256 | Benner | Jan. 21, 1930 |
| 1,879,562 | Smith | Sept. 27, 1932 |
| 2,117,371 | Slayter | May 17, 1938 |
| 2,230,271 | Simpson | Feb. 4, 1941 |
| 2,306,781 | Francis | Dec. 29, 1942 |
| 2,397,453 | White et al. | Mar. 26, 1946 |
| 2,428,470 | Powers | Oct. 7, 1947 |

FOREIGN PATENTS

| Number | Country | Date |
|---|---|---|
| 537,377 | Great Britain | June 19, 1941 |